United States Patent [19]
Carter

[11] 4,034,710
[45] July 12, 1977

[54] METHOD AND DEVICE FOR CATCHING AND PACKAGING LIVE FISH

[76] Inventor: Alvie Carter, 632 S. 1st West, Salt Lake City, Utah 84101

[21] Appl. No.: 646,163

[22] Filed: Jan. 2, 1976

[51] Int. Cl.$^2$ ..................................... A01K 77/00
[52] U.S. Cl. ..................................... 119/3; 43/11; 119/5
[58] Field of Search ............... 119/2, 3, 4, 5, 1; 43/11, 4, 12, 55, 56

[56] References Cited

U.S. PATENT DOCUMENTS

| | | | |
|---|---|---|---|
| 2,408,306 | 9/1946 | Flournoy | 43/11 |
| 2,949,882 | 8/1960 | Thomas, Jr. | 119/3 |
| 3,688,483 | 9/1972 | Hamilton | 119/1 |
| 3,747,250 | 7/1973 | Willinger | 43/11 |
| 3,882,624 | 5/1975 | Pityo | 43/12 |

Primary Examiner—John F. Pitrelli
Assistant Examiner—Peter K. Skiff
Attorney, Agent, or Firm—Mallinckrodt & Mallinckrodt

[57] ABSTRACT

An imperforate transparent bag is detachably attached to a substantially rigid frame adapted to hold the bag open. The frame has an elongate handle extending therefrom and is manipulated by means of the handle to introduce the bag into a confined body of water in which live fish are kept for sale. One or more of the fish and a protective quantity of water are entrapped within the bag, whereupon the handle is manipulated to remove the frame and bag from the water. The bag is then detached from the frame and tightly closed as a package for both the live fish and water contained therein.

11 Claims, 6 Drawing Figures

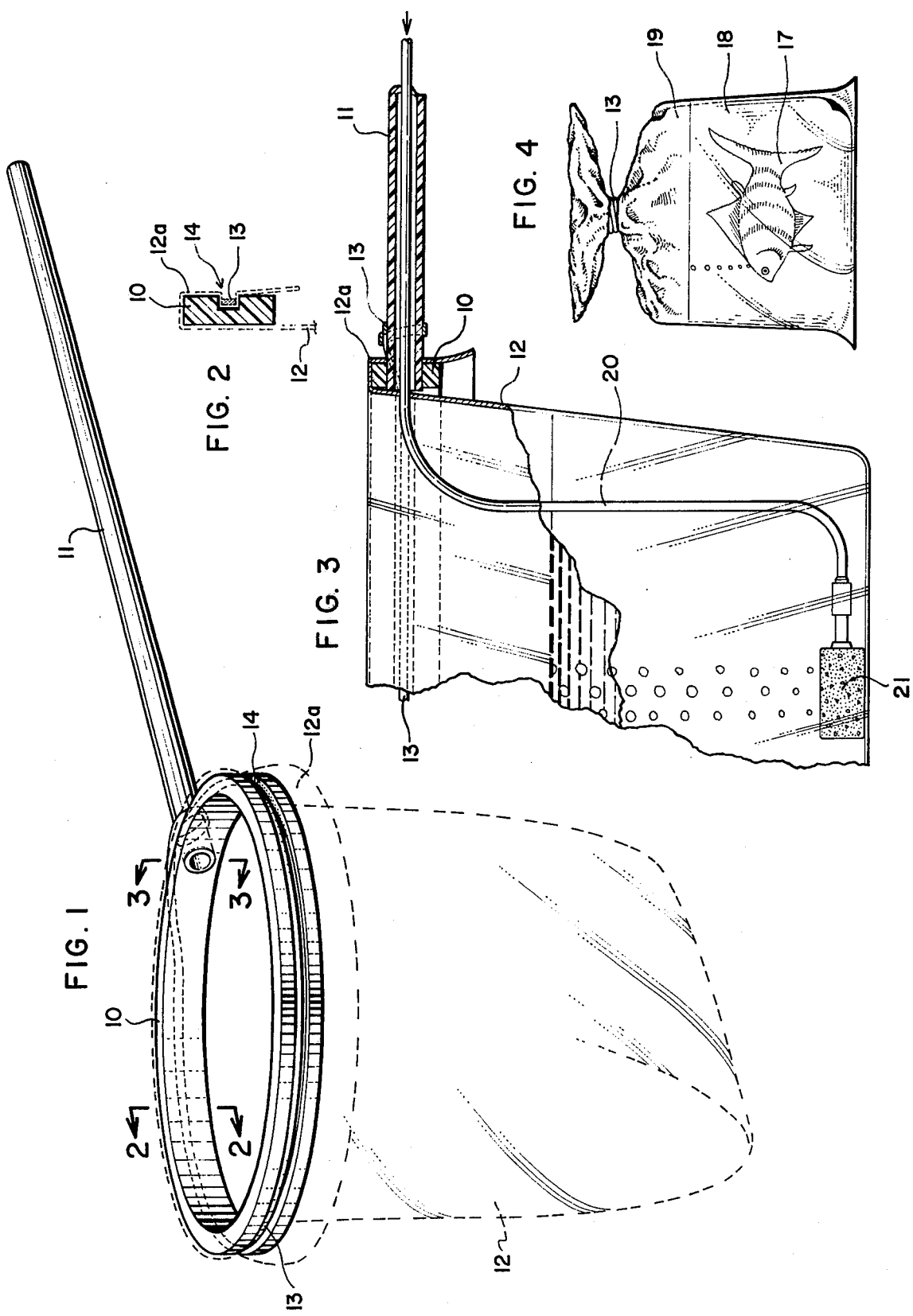

METHOD AND DEVICE FOR CATCHING AND PACKAGING LIVE FISH

BACKGROUND OF THE INVENTION

1. Field

The invention is a method and device for catching and packaging live fish, particularly tropical aquarium fish maintained for sale.

2. Prior Art

The common way of catching and packaging live fish in the sale of same for household aquariums is to dip a net into the confined body of water in which the fish are swimming, entraping the fish in the net, removing the net and entrapped fish from the water, removing the fish from the net, and placing the fish in a packaging container pre-filled with water. The use of nets, however, poses a serious problem. Very often a fish will become entangled in the net and be injured, either in the net or during the process of untangling and transfering the fish to the packaging container. Even without becoming entangled, mere contact with the net may and often does cause severe damage to the fish, particularly to its eyes. These problems are recognized in paragraph 8.3 of a book entitled "Marine Aquarium Keeping" by Stephen Spotte.

To overcome such problems, it has been suggested in the aboveidentifid book that a plastic bag be used to catch the fish, and that the plastic bag be the same as is commonly used as a packaging container for fish caught by a net.

The use of plastic bags for catching fish has not come into wide use, however, because of the difficulties they impose in catching the fish. A person must hold the bag open under the water and move the open bag through the water in pursuit of the rapidly moving fish. No method has heretofore been suggested for effectively catching a fish with a plastic bag.

SUMMARY OF THE INVENTION

According to the invention, live fish swimming freely in a confined body of water are caught and packaged by detachably attaching the mouth of an imperforate, transparent bag to a substantially rigid frame adapted to hold the bag open. An elongate handle extends from the frame. By manipulating the handle, the frame and attached bag are introduced into the body of water so that the bag is at least partially filled with water to provide easy maneuverability of the bag in the water. The frame and bag are further manipulated in the water so that one or more fish are entrapped within the bag. The frame and the attached bag containing water and fish are removed from the body of water. Enough water is spilled out of the bag to provide a neck for tight closing of the bag. The bag is then detached and tightly closed, the closed bag serving as a package for containing and transporting the fish along with a body of protective water.

It is usually desirable to spill out enough of the entrapped water so that, when the bag is tightly closed, there is a quantity of air as well as water in the bag with the fish.

Sometimes it is desirable to keep the fish in the bag for an extended period of time, and, in such circumstances, the bag may be used as an isolation tank. When used in this manner, an air hose, preferably with an air stone attached, is placed in the body of water in the bag to provide for aerating the water. For this purpose, the handle is made hollow so that an air hose may be passed through it and into the bag. It is convenient to rest the frame and handle across a portion of the top of an aquarium tank and to allow the bag, with water and fish therein, to rest in the water in the tank. This eliminates the need for a separate tank for separating baby fish or fish that need special chemical treatment.

The device comprises a substantially rigid, bag-holding frame, an elongate handle attached to the frame, and an imperforate, transparent bag. Means is provided for detachably attaching the mouth of the bag to and about the frame so that the bag is held in open position while capturing the fish and so that the bag may be detached and tightly closed as a package for the caught fish and the protective body of water taken in with the fish.

A satisfactory means for detachably attaching the bag to the frame includes a peripheral groove about the outer surface of the frame, and an elastic band stretched about and received by the peripheral groove after the bag has been applied thereto. Such elastic band may be looped about the elongate handle in a small anchoring loop at the point at which the handle intersects the frame, as well as being looped about the peripheral groove.

THE DRAWINGS

The invention is specifically described with reference to the accompanying drawings which illustrate the best mode presently contemplated for carrying out the invention.

In the drawings:

FIG. 1, is a perspective view of the bag-holding frame and manipulating handle of the device, the bag being indicated by dotted lines;

FIG. 2, a vertical section taken on the line 2—2 of FIG. 1;

FIG. 3, a fragmentary view in elevation (and partly in vertical section taken on the line 3—3 of FIG. 1) showing how the device is constructed for use with an air hose and air stone, e.g. for keeping fish in isolaton from other fish in a tank (see FIG. 6), the bag having been attached to the frame;

FIG. 4, a view in side elevation of a package in accordance with invention;

FIG. 5, a perspective view of an aquarium in which live fish are kept for sale, showing how the device of the invention is used to catch fish for packaging; and FIG. 6, a similar view showing how the device of the invention is used to maintain certain of the fish isolated from other fish in the aquarium.

DETAILED DESCRIPTION OF THE ILLUSTRATED EMBODIMENT

Figure 5:
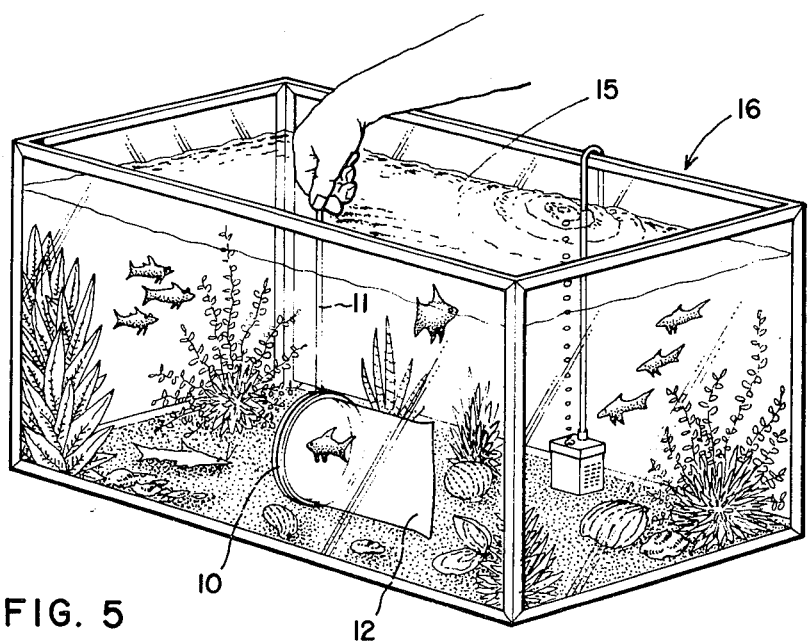

As shown, see particularly FIG. 1, the device of the invention includes a rigid, bag-holding frame 10 having an elongate handle 11. Frame 10 is adapted to receive and have detachably attached thereto a transparent plastic bag 12, such as is now used for transporting live tropical fish. The upper portion of bag 12, marginal to its open mouth, is cuffed as at 12a preparatory to attachment of the bag to frame 10. As applied to the frame, the bag is held in place by means of an elastic band 13 stretched about the frame and over cuff 12a within a peripheral groove 14 formed exteriorly of the frame. The elastic band may be conveniently looped over handle 11 for anchorage to the base of the handle, as indicated in FIGS. 1 and 3, before it is stretched about cuff 12a in groove 14.

Bag 12, as so attached to frame 10 with its open mouth positively held open, is then introduced into the confined body of water in which the fish to be caught and packaged are swimming freely. Thus, as illustrated in FIG. 5, the device is manipulated by handle 11 to introduce frame 10 into body of water 15 confined in aquarium 16. The bag fills at least partially with water, which makes for easier manipulation of the bag under the water. If a large amount of air is entrapped with the water, the bag will tend to float and make manipulation difficult. By holding and manipulating the device under the water, as shown in FIG. 3, one or more of the fish in aquarium 16 can be quickly and easily entrapped within bag 12 along with the water therein. Following this, the device, with its attached bag containing both water and fish, is removed from the body of water 15. Enough water is purposely spilled out of the bag during or after this step of the procedure to enable the bag to be closed following its removal from frame 10. The bag is detached from frame 10 by grasping it below the frame in the area from which water has been spilled and by pulling it from its temporary, resilient attachment to the frame. The bag is then closed in the usual manner by bunching the mouth portion together and securing it in its bunched condition, see FIG. 4. Securement band 13 may be used for this purpose, or any other rubber band or wire tie strip that might be handy can be used. The thus packaged live fish 17 and protective body of water 18 can then be transported from the point of sale in a fish or pet store, for example, to a home aquarium.

It is preferable for transporting of the fish that a quantity of air 19, FIG. 4, as well as the water 18 be present in the bag. This is easily provided by securing the bag well above the body of water 18 therein.

In accordance with the present invention, a fish may be caught and removed from a tank, transported, and replaced into another tank without its ever touching a net or packaging material and without ever being out of water or touched by human hands. This greatly reduces the incidence of disease resulting from damage or injury to the fish occurring during transfers from tank to tank. Also the transparent bag blends into the water, so it is difficult for a fish to see it. This further reduces trauma a fish may experience while being caught.

Sometimes it is desirable to separate fish in an aquarium, either for holding purposes after a sale or otherwise. For example, newly born baby fish must be separated from a male fish, who may otherwise eat the babies, or a fish that need special chemical treatment must be removed from the aquarium so that the remaining fish do not also receive the treatment. The present device may be conveniently used as an isolation tank for such fish. FIG. 3 shows an air hose 20 extending through the elongate handle 10, which is hollow for the purpose, continuing on through the plastic of the attached bag (which is punctured for the purpose), and continuing on to the bottom of the attached bag. An air stone 21 is attached in usual manner to the bag end of such air hose, the other end being attached to a source of compressed air (not shown). The supplied air bubbles from the air stone and aerates the water in the bag. Fish can thus live indefinitely in the water contained in the bag.

Figure 6:
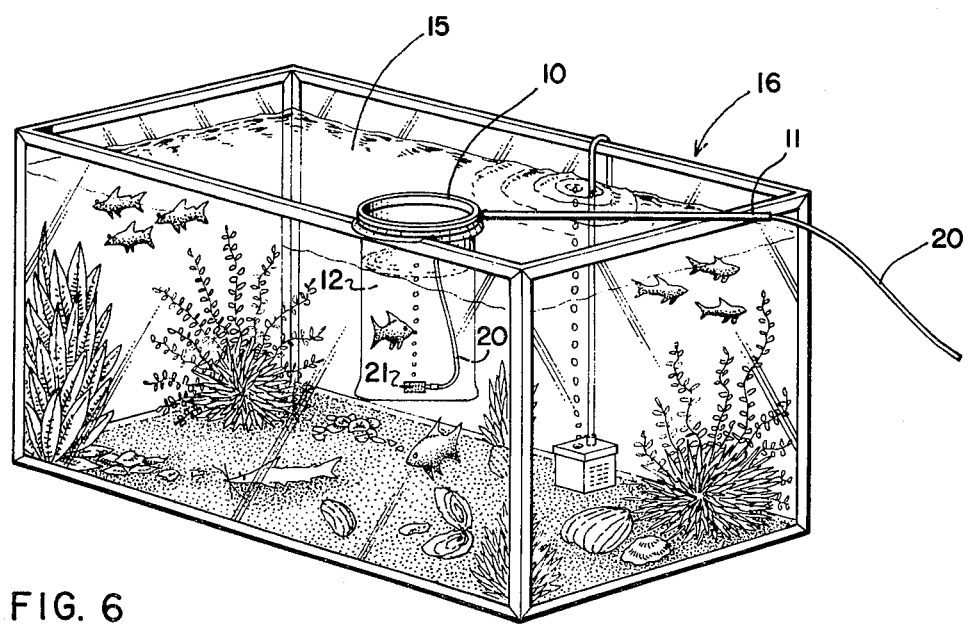

The device may be conveniently rested on the aquarium tank, with the bag 12 dipping into and being buoyed up by the water in the tank, see FIG. 6. The water level in the bag will be approximately that in the aquarium tank. In this way the fish in the bag will be isolated from the remaining fish in the tank without apparent separation and without the need for a second aquarium tank.

Whereas the invention is here illustrated and described with respect to a presently preferred form thereof, it is to be understood that variations are possible without departing from the inventive concepts particularly pointed out in the claims.

I claim:

1. A method of capturing and packaging live fish swimming freely in a confined body of water, comprising detachably attaching the open mouth portion of an imperforate, transparent bag to a substantially rigid frame adapted to hold the bag open, said frame peripherally defining an opening substantially commensurate with the opening of the bag, having an elongate handle extending therefrom, and being free of projections that could harm the fish to be caught; manipulating the handle to introduce the frame and attached bag into and under the surface of the body of water and to at least partially fill the bag with water for easy maneuverability within the body of water; manipulating said frame and bag beneath the surface of said body of water from above said surface to entrap one or more fish within the bag; removing the frame and attached water-and-fish-containing bag from the body of water, while spilling out enough water, if necessary, for tight closing of the bag; detaching the so-filled bag from the frame; and tightly closing the mouth portion of the bag to form a closed package containing the captured fish and a protective quantity of water.

2. A method according to claim 1, wherein enough water is spilled out of the bag and the mouth of the bag is closed above the level of water in the bag to provide a quantity of air above the water in the bag when the bag is closed as a package.

3. A method according to claim 1, wherein air is bled into the water within the bag during an extended period of time prior to closing the bag.

4. A method according to claim 3, wherein the elongate handle is hollow; and air is bled into the water in the bag through the hollow handle.

5. A method according to claim 4, wherein the body of water is confined in an open tank; the frame and handle are rested upon and supported by the tank; with the bag and contents resting in and buoyed up by the body of water.

6. A device for catching and packaging live fish swimming freely in a confined body of water, comprising a substantially rigid frame adapted to receive an imperforate, transparent bag and to hold it open, said frame having a peripheral member defining an opening substantially commensurate with the opening of a bag to be received and being free of projections that could harm the fish to be caught; an elongate handle attached to and extending from the frame; an imperforate, transparent bag having an open mouth adapted for attachment to the frame in open position; and means for detachably attaching the mouth of the bag to and about the frame so that the bag is held in open position while capturing fish but may be easily detached and closed as a package for fish and water entrapped in the bag.

7. A device according to claim 6, wherein the frame includes a peripheral groove externally thereof; and the means for detachably attaching the bag to the frame comprises an elastic band adapted to be stretched about and received by the peripheral groove after the bag has been applied thereto.

8. A device according to claim 7, wherein the handle intersects the groove so that the elastic band can be looped about the handle in a small anchoring loop, as well as about the peripheral groove of the frame in a relatively large bag-holding loop.

9. A device according to claim 6, wherein the bag is detachably secured to the frame.

10. A device according to claim 6, wherein the handle is hollow to provide a passage therethrough for receiving an air hose.

11. A device according to claim 10, wherein the bag is detachably secured to the frame, an air hose extends through the hollow handle and terminates within the bag, and an airstone is secured to said end of the air hose within the bag.

* * * * *